United States Patent [19]

Watson

[11] Patent Number: 4,493,335

[45] Date of Patent: Jan. 15, 1985

[54] SHEAR VALVE

[75] Inventor: Richard R. Watson, Bellaire, Tex.

[73] Assignee: Gilmore Valve Company, Bellaire, Tex.

[21] Appl. No.: 398,758

[22] Filed: Jul. 15, 1982

[51] Int. Cl.³ ............................................... F16K 3/18
[52] U.S. Cl. ............................... 137/116.3; 137/625.65
[58] Field of Search ...................... 137/116.3, 107, 102, 137/625.65

[56] References Cited

U.S. PATENT DOCUMENTS

| 3,286,734 | 11/1966 | Hartshorne | 137/116.3 |
| 3,416,554 | 12/1968 | Po-Lung Liang | 137/116.3 |
| 3,917,220 | 11/1975 | Gilmore | 137/116.3 |

Primary Examiner—Martin P. Schwadron
Assistant Examiner—James R. Shay

[57] ABSTRACT

A shear valve includes vent, supply and regulated ports, with the latter two including coaxial connection means.

9 Claims, 7 Drawing Figures

NEUTRAL POSITION

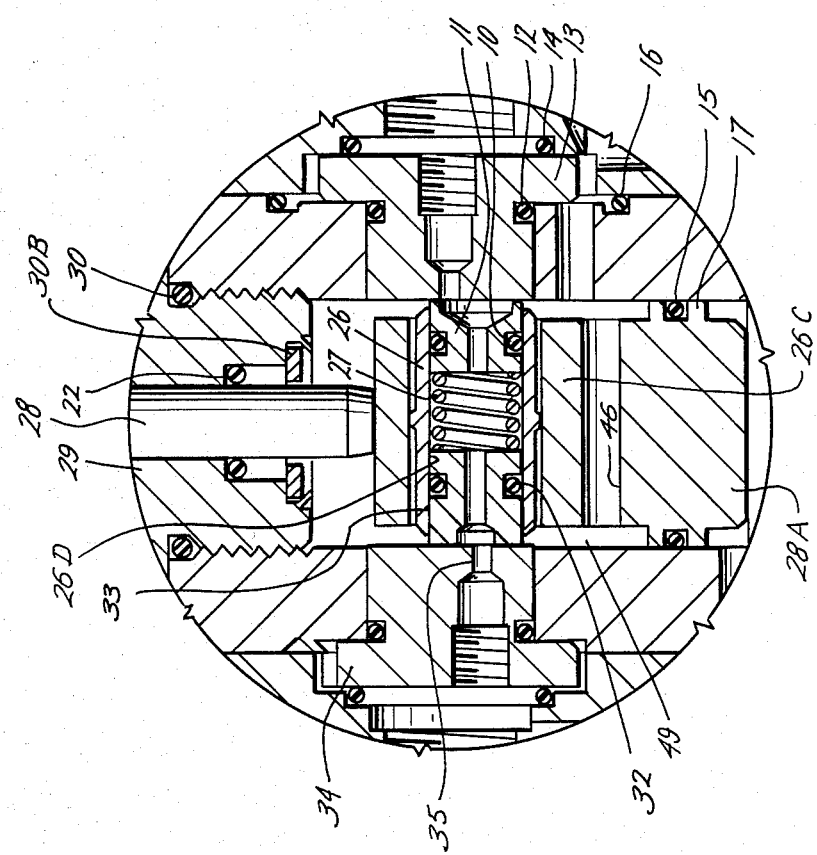
Fig. 2B SUPPLY POSITION
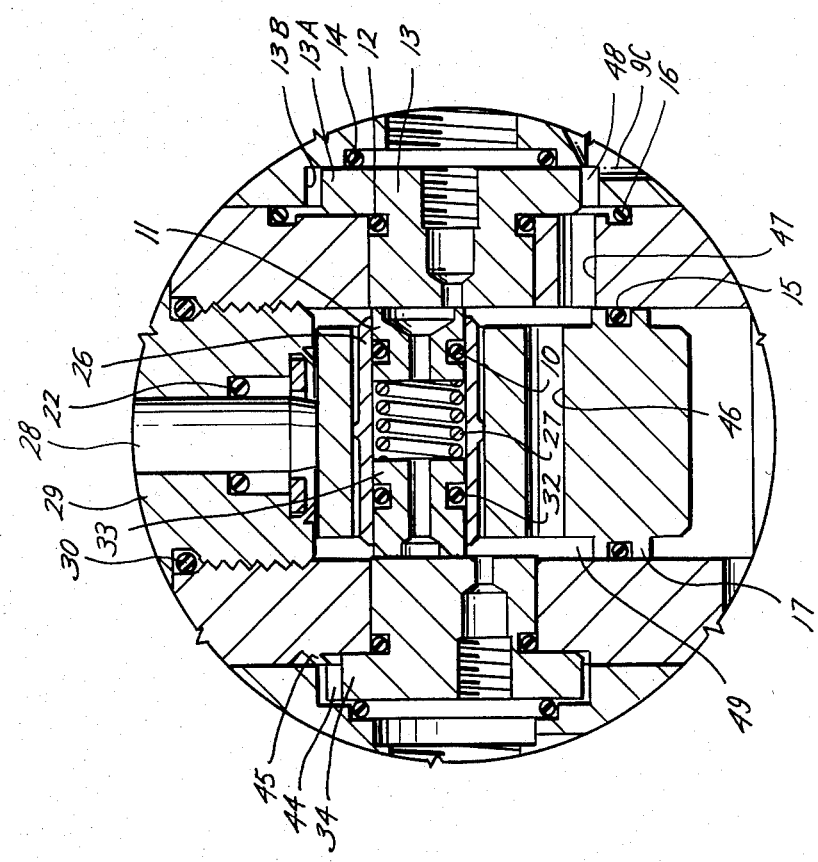
Fig. 2A VENT POSITION

4,493,335

SHEAR VALVE

SUMMARY OF THE INVENTION

A shear valve for pressure regulation includes a hollow body having three ports thereto, including a first or supply port to be connected to a source of fluid under pressure, e.g. hydrostatic fluid such as oil or water, a second or regulated port on the opposite side of the body from the supply port, the regulated port to be connected to something wherein fluid at a constant or adjustable regulated pressure is desired; and a third vent port on the same side of the body as the supply port, the vent port venting fluid from the body of the valve.

When the valve is in a first or supply position, flow from the supply port is conducted to the regulated port via a carrier mounted, rockable flow tube having a spring biased seal tube at each end to seal between the flow tube and a replaceable seat around the respective port. In a second or neutral position of the valve, the regulated port is blocked off from both the other ports. In a third or vent position of the valve, the flow tube is blocked off by the seat at the regulated port and the latter is open via a first chamber of the body of the valve to the vent port, the fluid passing through a passage in the carrier parallel to the flow tube. The carrier is mounted for reciprocation in the valve body; the carrier is urged toward supply position by a pair of coaxial, paralleled, helical springs, adjustably compressed. The carrier may be moved to a neutral position or to a vent position by a piston on the end of the carrier opposite from the spring, a second chamber in the valve body formed between the piston and an end of the valve body being connected to the regulated port. The connection is made downstream of the regulated port valve seat considered when the valve is in supply position or upstream of the regulated port valve seat considered when the valve is venting.

Generally speaking, the valve is similar in function and result and gross structure to the valve shown in prior U.S. Pat. No. 3,917,220—Gilmore, FIGS. 4-6, to which patent reference may be made for discussion of the utility of the valve in subsea operations, the present invention being an improvement on the Gilmore patent construction eliminating the need for one of two sets of carrier mounted flow tubes required in the Gilmore construction, and providing for coaxial supply and regulated ports, making it easy to place the valve in a line, and generally simplifying the construction.

Comparing the regulator of the Gilmore patent with the present construction, it will be noted that in the older Gilmore construction the valve body and the piston therein are connected to the regulated port or outlet of the valve, and that as the outlet pressure varies the piston moves the valve to connect the valve body to a pressure fluid supply pipe or to a vent line. On the other hand, in the present construction, the valve body is divided into two parts separated by a sealed piston. One side of the piston is connected to the regulated port and the stem side is vented. As the valve moves due to pressure changes on the piston, a vent port and a pressure fluid supply port are alternately connected to the regulated port.

Other features and advantages of the valve will appear hereinafter.

BRIEF DESCRIPTION OF THE DRAWINGS

For a detailed description of a preferred embodiment of the invention reference will now be made to the accompanying drawing wherein:

FIG. 2A is a repeat of FIG. 2 but showing the valve in a vent position;

FIG. 2B is a repeat of FIG. 2A, but showing the valve in supply position;

Figure 1:
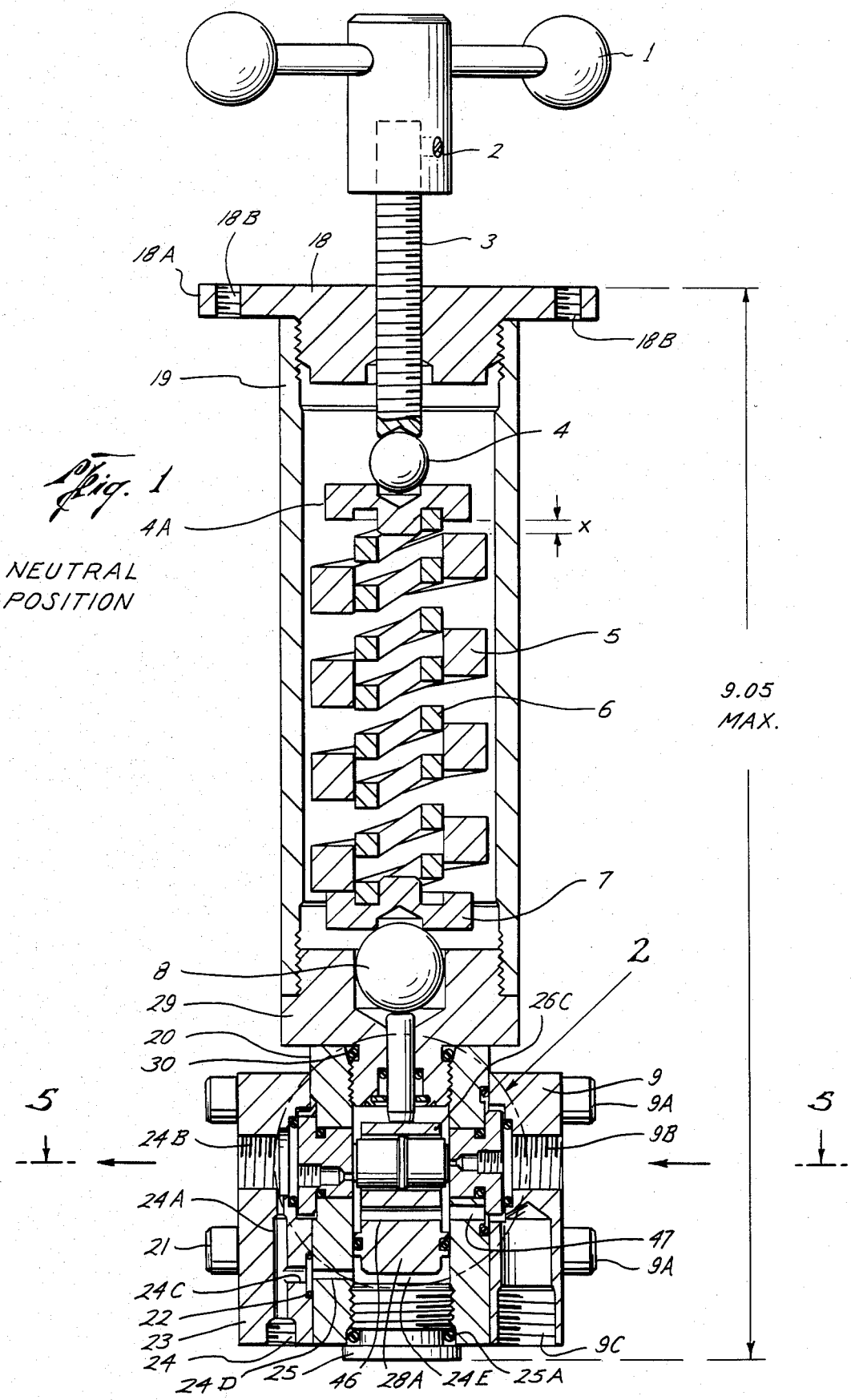
FIG. 1 is a vertical section through a valve embodying the invention, showing the valve in the neutral position.

The drawings are to scale, one dimension, the length of the valve body and spring housing combined, being shown in FIG. 1 to be about 9.05 inches.

The conventions of the United States Patent and Trademark Office in patent cases are employed to indicate materials, from which it will be seen that all parts are made of metal, e.g. steel, except for the O-ring seals which are made of rubber or other suitable elastomer or sealing material.

A. Parts List

Referring now to the drawings, the component parts of the manually adjustable pressure regulating valve there shown are identified by reference numbers as follows:

1. *handle*, with threaded socket
2. *set screws*, in socket
3. *shaft*, externally threaded, screwed into socket and through threaded center bore of plug 18
4. *ball*, bearing against conically recessed end of shaft 3 and against recessed center of spring cap 4A
4A. *spring cap*, bearing against end of inner, smaller coil diameter spring 6
5. *outer helical spring*, of larger coil diameter and larger wire diameter than spring 6, disposed concentrically thereabout, and of shorter length than spring 6
6. *inner helical spring*, bearing against spring cap 7
7. *spring cap*, which also bears against spring 5, which also receives load from spring cap 4A when inner spring 6 is compressed by distance "X"
8. *ball*, receiving thrust from spring cap 7 and received in central socket in valve bonnet 29
9. *plate*, retaining replaceable seat 13
9A. four cap screws, securing plate 9 to flat side of valve body
9B. *inlet port*, in plate 9, internally threaded
9C. *vent port*, in plate 9, internally threaded
10. O-ring sealing seal tube 11 to flow tube 26,
11. *seal tube*, with external groove receiving O-ring 10, and slidable in bore 26D, with its annular flat outer end lying flat against and sealing with flat seat face 13E of seat ring 13
12. O-ring seal, sealing between body 20 and seat 13
13. *seat ring*, cylindrical, received in transverse bore 20B in valve body, and tangent to circular cross-section inner bore 20A of valve body, and having an external recess receiving O-ring 12, and an outer circular flange 13A lying against outer flat side of valve body 13A. flange on seat ring received in annular rabbet 13B in plate 9
13B. annular rabbet, larger in diameter than flange 13
13C. annular passage between flange 13 and rabbet 13B
13D. passage, communicating with face 13E of seat ring 5
13E. flat, sealing, seat face of seat ring 13
13F. threaded passage, communicating with passage 13D and with inlet port 9B
14. O-ring seal, between seat flange 13A and plate 9, received in annular rabbet 14A around inner end of inlet port 9B
14A. annular rabbet
15. O-ring seal between cylindrical bore 20A of valve body and cylindrical piston 28A, captured between two annular flanges 17 around the gate
16. O-ring seal between plate 9 and valve body 20 outside
17. annular flange
18. plug, externally threaded and screwed into spring housing 19
19. *spring housing,* tubular
20. *valve body,* cross section has square outer periphery
20A. *bore,* cylindrical, in valve body 20
20B. *cylindrical port,* in valve body, at inlet
21. four cap screws
22. O-ring, sealing valve stem 28 to valve bonnet 29
23. *plate,* secured to flat side of valve body 20 by cap screws 21
24. socket, to be plugged, e.g. with weld metal or screw plug, after boring fluid passage 24A (see FIG. 1)
24A. fluid passage, connects regulated port 24B in plate 23 to passage 24C in plate 23
24B. *regulated port,* internally threaded
24C. fluid passage, connects passage 24A to passage 24D in valve body
24D. fluid passage, connects to chamber 24E formed in valve body between gate 28A and screw plug 25
24E. *chamber,* communicating with regulated port 24B
25. plug, screwed into threaded socket in end of valve body
25A. O-ring, seals plug to body 20
26. *flow tube,* internally and externally cylindrical
26A. flange, annular, radial, on outer periphery of tube 26, provides rockable mounting of tube in bore 26B (see Gilmore patent above)
26B. bore, cylindrical, transverse to axis of cylindrical carrier 26C
26C. *carrier,* cylindrical, integral at one end with piston 28A and at other end with valve stem 28
26D. cylindrical bore of flow tube 26
27. *helical spring,* urging apart seal tube 11 and seal tube 33 slidably mounted in inner bore 26D of flow tube
28. *valve stem,* receiving thrust from springs 5 and 6 via ball 8, urging valve to vent position
28A. *piston,* receiving fluid pressure from regulated port 24B, urging valve to supply position
29. *valve bonnet,* externally threaded, large end screwed into spring housing 19, small end screwed into valve body 20
30. O-ring, sealing valve bonnet to valve body
30A. annular groove, in bonnet, receiving O-ring 30
30B. washer, pressed or swaged into bonnet 29, retains O-ring 30 in groove 30A
32. O-ring, sealing seal tube 33 to flow tube 26
33. *seal tube,* with external groove receiving O-ring 32, and slidable in bore 26D with its annular flat outer end lying flat against and sealing with flat seat face 35A of seat ring 34A
34. radial flange, on valve seat 34A
34A. *seat ring,* similar to ring 13A but with eccentric passage
35. passage, communicating with face 35A of seat ring 34A
35A. flat, sealing, seat face of seat ring 34A
36. threaded passage, communicating with passage 35 and with regulated port 24B
37. O-ring, seals seat ring 34A to bore 38
38. annular groove, in seat ring 34A, receiving O-ring 37
39. cylindrical bore, in valve body
40. O-ring, seals seat ring flange 34 to plate 23
41. annular rabbet, in plate 23, receiving O-ring 40
42. annular rabbet, in plate 23, receiving O-ring 40
43. annular rabbet, in body 20, receiving flange 34
44. radial slot, in flange 34 (see FIG. 2A)
45. boss, in rabbet 43, received in slot 44, for azimuthal alignment of seat 34A
46. vent passage, through carrier 26C (see FIG. 1)
47. vent passage, through valve body 20, communicating with passage 46 and with passage 48 formed between rabbet 13B and flange 13A.
48. annular passage, communicating with vent port 9C
49. *chamber,* formed in valve body bore 20A between piston 28A and valve bonnet, to communicate vent port 46 with passage 35 when valve in vent position (FIG. 2B)

B. Operation

Figure 2:
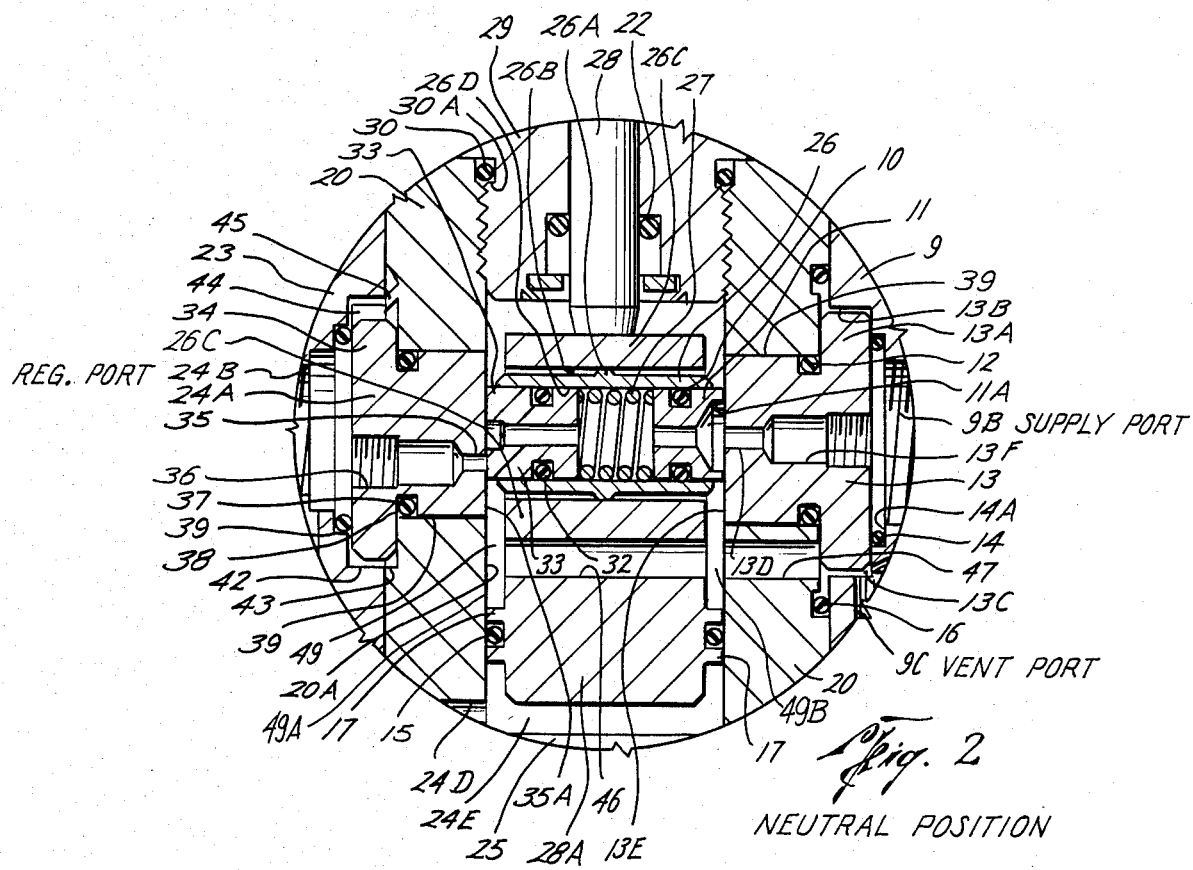
FIG. 2 is an enlarged view of the portion of the valve indicated in FIG. 1.

The valve is shown in the neutral position in FIGS. 1 and 2. Should the pressure at regulated port 24B drop, the pressure in chamber 24E on piston 28A will drop and spring 6 will move carrier 26C towards chamber 24E until seal tube 33 communicates with passage 35, the position shown in FIG. 2B, causing fluid from supply port 9B to be admitted to regulated port 24B. When the regulated port pressure rises high enough, the pressure in chamber 24E acting on piston 28A will overcome spring 6 and move carrier 26C towards spring 6, closing off passage 35 in whole or in part, sufficiently to maintain the desired pressure at the regulated port.

If passage 35 is completely closed, as shown in FIG. 2, and the pressure at the regulated port rises, piston 28A will move carrier 26C toward bonnet 29 until passage 35 is uncovered and communicated with chamber 49 so that fluid can flow to vent port 9C, the position shown in FIG. 2A. When pressure at the regulated port drops, spring 6 will move carrier 26C towards the neutral position, closing off passage 35 in whole or in part sufficiently to maintain the desired pressure at the regulated port.

It is to be noted that the distance between the inner periphery of seal tube 33 and the outer periphery of seal tube 33 is greater than the diameter of passage 35, so that it is not possible for passage 35 to communicate simultaneously with supply port 9B and vent port 9C.

The travel of carrier 26C is limited, e.g. by piston 28A contacting plug 25 and carrier 26C contacting bonnet 29, so that annular lip 11A on seal tube 11 always surrounds supply passage 13D, so that passage 13D cannot communicate via body chamber 49 with vent port 9C.

Supply port 9B and regulated port 24B are coaxial, so the regulator valve can be placed in a flow line without difficulty.

Seal tubes 11 and 33 are biased toward their seats both by spring 27 and by fluid pressure in flow tube 26, so they are always in sealing engagement with their seats. The rockable mounting of the flow tube insures that the seal tubes lie flat against their seats.

Preferably, as shown, the external grooves in seal tubes 11 and 33 receiving O-rings 10 and 32 are of greater axial extent than the wire diameters of the O-rings, e.g. they have axial lengths of the order of twice the wire diameter of the O-rings, to allow movement of the O-rings so as to seal without binding.

Figure 5:
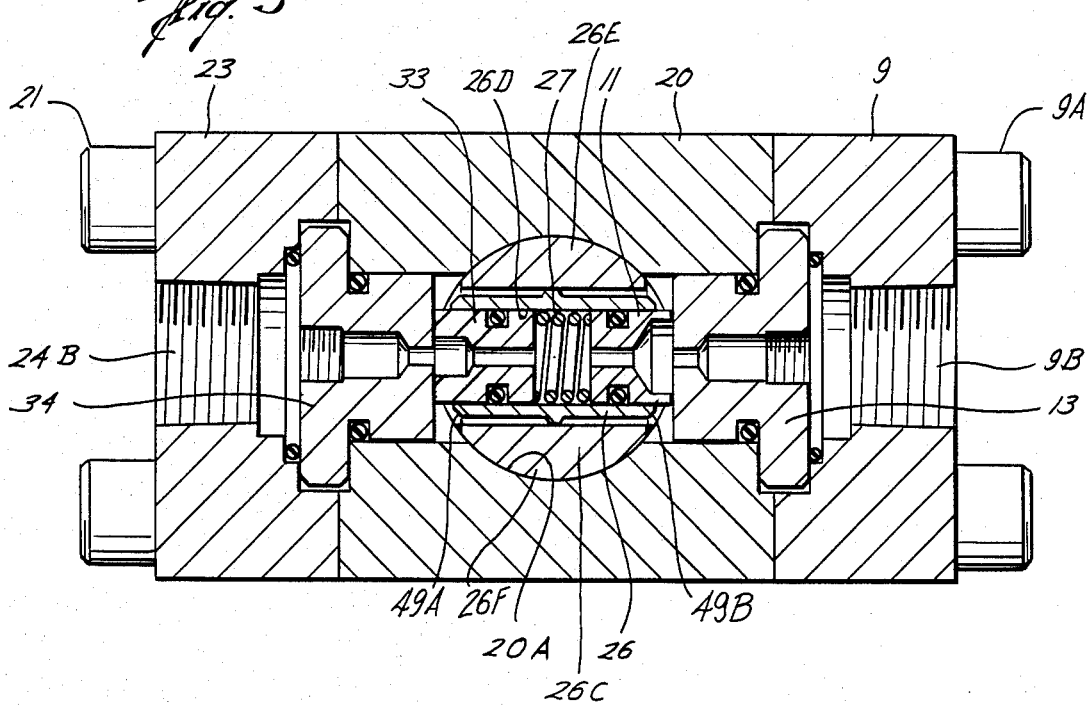
FIG. 5 is a horizontal section taken at plane 5—5 indicated in FIG. 1.
Figure 3:
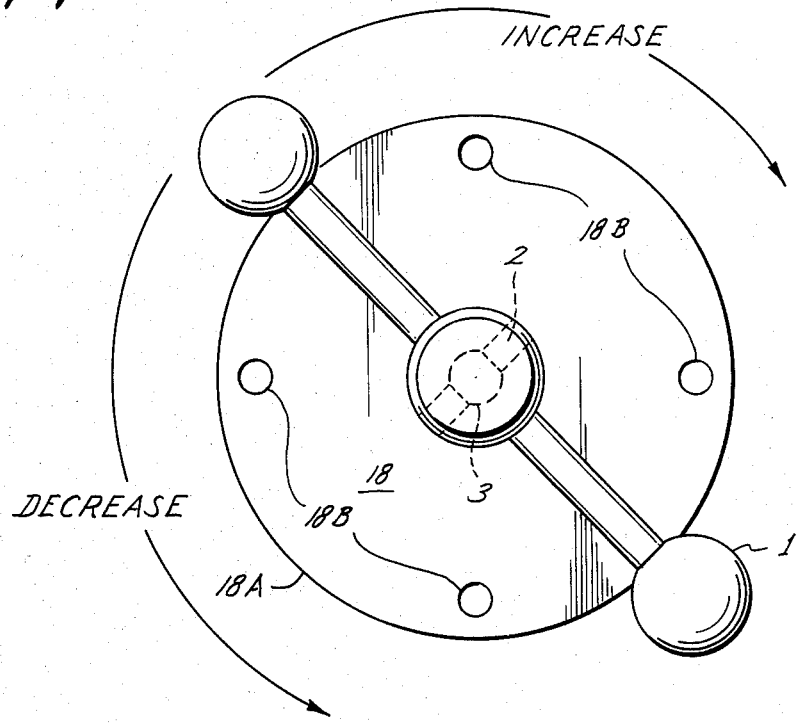
FIG. 3 is a top view of the valve, as viewed in FIG. 1.
Figure 4:
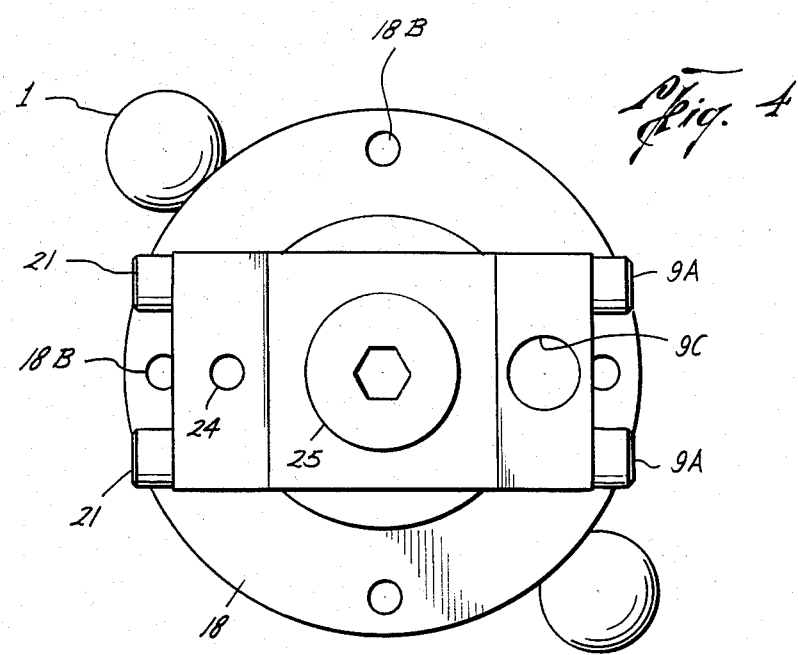
FIG. 4 is a bottom view of the valve, similarly viewed.

Passage 46 makes it possible to provide axial guide portions 26E, 26F on the exterior of the carrier, dividing up chamber 49 into two segments 49A, 49B as shown in FIG. 5 hereof. In other words, the carrier will be generally cylindrical of a diameter to fit slidably within valve body bore 20A but having flat sides adjacent the seat plates.

The ends of flow tube 26 are nominally out of contact with bore 20A, as shown in FIG. 5, but can slide in bore 20A should the flow tube shift axially to contact bore 20A.

To adjust the regulated pressure, handle 1 can be rotated to increase or decrease the precompression of spring 6. If an even higher regulated pressure is desired, handle 1 can be turned far enough to compress spring 5 as well as spring 6. A diaphragm or piston subject to a controlled or fixed liquid or gas pressure or to a constant mass of elastic fluid could be substituted for the springs, in fact any resilient means could be suitable.

While a preferred embodiment of the invention has been shown and described, modifications thereof can be made by one skilled in the art without departing from the spirit of the invention. Although the regulator valve is intended primarily for regulating liquid pressure, it can also be used for regulating gas pressure.

By connecting passage 24A to a separate source instead of to port 24B, the pressure at port 24B could be controlled by the separate source, i.e. a pilot operated valve would be provided.

I claim:

1. A valve comprising a hollow body providing a valve chamber and having a supply port, a regulated port, and a vent port;
    a valve member mounted for movement in said chamber of said body along a certain direction defining the valve axis;
    said valve member having fluid passage means extending therethrough transversely of said axis;
    mounting means mounting said valve member for said axial movement, said mounting means mounting said valve member for movement inside said body relative to said ports between
    (a) a group of supply positions in which said regulated port and supply port are to varying degrees in communication through said passage means and said vent port is blocked off from said regulated port and supply port,
    (b) at least one neutral position in which all three of said ports are blocked off from each other, and
    (c) a group of vent positions in which said regulated port and vent port are to varying degrees in communication and said supply port is blocked off from said regulated port and vent port,
    resilient means urging said valve member toward said group of supply positions, and
    piston means to urge said valve member toward said group of vent positions,
    said regulated port when said valve is in said supply positions communicating with said supply port solely through said passage means in said valve member without communicating with said chamber in the valve body in which said valve members moves, said chamber at all times being in communication with said vent port.

2. Valve according to claim 1, including regulator passage means outside of said valve member communicating said regulated port with said piston means at a side thereof tending to move said piston means into said chamber, the other side of said piston means being always subjected to vent port pressure.

3. Valve according to claim 2,
    said piston means dividing the interior of said hollow body into a pressure chamber and a vent chamber, said vent chamber being the chamber in which said valve member moves,
    said regulator passage means connecting to said pressure chamber and said vent port communicating with said vent chamber.

4. Valve according to claim 1, 2, or 3,
    said regulated port and supply port being disposed at opposite sides of said hollow body,
    said fluid passage means in said valve member defining a hole extending transversely through said valve member and including a flow tube rockably mounted in said hole and seal tube means slidably mounted in said flow tube in sealing engagement therewith and adapted to seat in said body adjacent to said supply and regulated ports,
    said flow tube providing a passage for flow of fluid from said supply port to said regulated port in said supply positions of said valve.

5. Valve according to claim 4, said body including seat rings releasably mounted therein containing respectively said supply and regulated ports, said ports being parallel but non-concentric, said body further including ported plates releasably secured to the remainder of the body to retain said seat rings therein and to communicate said supply and regulated ports to the exterior of the valve, said ported plates having ports that are coaxial whereby the valve can easily be connected in a straight pipe line.

6. Valve according to claim 4,
    said supply and regulated ports terminating interiorly of said body at openings in flat valve seats having circular flow openings therein,
    said seal tube means including a first seal tube slidably mounted in one end of said flow tube for communication with said supply port, and a second seal tube slidably mounted in the other end of said flow tube for communication with said regulated port, said seal tubes having annular flat ends adjacent said flat valve seats, the radial wall thickness of the end of the seal tube adjacent the regulated port valve seat being greater than the diameter of the regulated port valve seat flow opening, and means limiting the axial travel of said valve member whereby the outer periphery of the annular end of the flow tube adjacent the supply port valve seat always circumscribes the supply port valve seat flow opening.

7. Valve according to claim 4,
    said fluid passage means in said valve member further defining a second hole extending transversely through said valve member communicating the space inside the valve body adjacent the regulated port with the space inside the valve body adjacent the vent port, whereby fluid moving from the regulated port to the vent port need not pass around the valve member.

8. Valve according to claim 7,
said holes being parallel,
said vent port opening into the interior of said body in the same azimuthal plane about the valve axis as said supply port,
said azimuthal plane containing the axis of said holes.

9. Valve according to claim 8,
said hollow valve body including a cylindrical interior portion defining a cylinder,
said valve member including a cylindrical portion defining said piston means,
said piston means including a piston axially slidable in said cylinder and an O-ring seal about the piston sealing between the piston and cylinder,
said valve member being provided on its exterior with axially extending cylindric guide portions adapted to slide within said cylinder, said guide portions dividing the adjacent part of said cylinder into segments including a segment adjacent said regulated port and a segment adjacent said vent and supply ports, said second hole of said flow passage means providing communication between said segments.

* * * * *